(12) United States Patent
Choi et al.

(10) Patent No.: US 9,980,273 B2
(45) Date of Patent: May 22, 2018

(54) METHOD FOR PERFORMING MEASUREMENT IN CLOUD WIRELESS COMMUNICATION SYSTEM AND DEVICE FOR SAME

(71) Applicant: LG ELECTRONICS INC., Seoul (KR)

(72) Inventors: Hyeyoung Choi, Seoul (KR); Jaehoon Chung, Seoul (KR); Eunjong Lee, Seoul (KR); Heejeong Cho, Seoul (KR); Genebeck Hahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days. days.

(21) Appl. No.: 15/103,683

(22) PCT Filed: Jun. 2, 2014

(86) PCT No.: PCT/KR2014/004886
§ 371 (c)(1),
(2) Date: Jun. 10, 2016

(87) PCT Pub. No.: WO2015/093698
PCT Pub. Date: Jun. 25, 2015

(65) Prior Publication Data
US 2016/0316479 A1    Oct. 27, 2016

Related U.S. Application Data

(60) Provisional application No. 61/916,724, filed on Dec. 16, 2013.

(51) Int. Cl.
*H04W 72/00* (2009.01)
*H04W 72/08* (2009.01)
(Continued)

(52) U.S. Cl.
CPC ......... *H04W 72/085* (2013.01); *H04L 5/0035* (2013.01); *H04W 16/24* (2013.01);
(Continued)

(58) Field of Classification Search
CPC ..... H04W 24/10; H04W 24/08; H04W 36/30; H04W 28/20; H04W 88/06; H04W 24/02;
(Continued)

(56) References Cited

U.S. PATENT DOCUMENTS

2012/0236751 A1    9/2012   Lee et al.
2012/0275363 A1*  11/2012   Hu .................... H04W 52/0206
                                                  370/311
(Continued)

FOREIGN PATENT DOCUMENTS

KR    10-2012-0097280 A     9/2012
WO    WO 2012/153988 A2    11/2012
(Continued)

*Primary Examiner* — Fred Casca
(74) *Attorney, Agent, or Firm* — Birch, Stewart, Kolasch & Birch, LLP

(57) ABSTRACT

Provided is a method by which a terminal performs a measurement in a cloud wireless communication system comprising one or more baseband units (BBUs), and one or more remote radio units (RRUs) connected to the specific BBU among the BBUs so as to directly provide services to the terminal through one or more cells. According to the present method, the terminal respectively receives a first measurement configuration message and a second measurement configuration message from a first BBU and a second BBU, which are connected, includes, in a first measurement report message and a second measurement report message, the results of performing a measurement on one or more first RRUs to be measured according to the first measurement configuration message and a measurement on one or more second RRUs to be measured according to the second measurement configuration message, and then transmits the
(Continued)

first measurement report message and the second measurement report message, wherein when the first RRUs and the second RRUs include one or more overlapping RRUs, the measurement result of one or more overlapping RRUs is included only in either the first measurement report message or the second measurement report message.

6 Claims, 8 Drawing Sheets

(51) Int. Cl.
  *H04W 24/00* (2009.01)
  *H04W 28/04* (2009.01)
  *H04W 16/24* (2009.01)
  *H04W 24/10* (2009.01)
  *H04L 5/00* (2006.01)
  *H04W 88/08* (2009.01)

(52) U.S. Cl.
  CPC ............ *H04W 24/00* (2013.01); *H04W 24/10* (2013.01); *H04W 28/04* (2013.01); *H04W 88/085* (2013.01)

(58) Field of Classification Search
  CPC .............. H04W 88/085; H04W 88/08; H04W 52/0206; H04W 60/00; H04W 64/006; H04W 68/005; H04W 72/085; H04W 76/04; H04W 28/08; H04W 72/04; H04W 48/10
  USPC ..... 370/252, 311, 332; 455/450, 466, 452.1, 455/422.1, 434, 453, 458, 423, 435.1, 455/446, 447, 509, 515, 553.1, 67.11
  See application file for complete search history.

(56) References Cited

U.S. PATENT DOCUMENTS

| 2014/0112177 | A1 | 4/2014 | Park et al. |
| 2014/0200016 | A1* | 7/2014 | Siomina ................ H04W 24/08 455/450 |
| 2015/0036664 | A1 | 2/2015 | Yuk et al. |
| 2015/0049623 | A1 | 2/2015 | Yuk et al. |
| 2015/0365934 | A1* | 12/2015 | Liu ....................... H04L 5/0039 370/329 |

FOREIGN PATENT DOCUMENTS

| WO | WO 2013/025160 A1 | 2/2013 |
| WO | WO 2013/081257 A1 | 6/2013 |
| WO | WO 2013/125900 A1 | 8/2013 |

\* cited by examiner

MeNB : macro eNodeB
PeNB : pico eNodeB
FeNB : femto eNodeB

MUE : macro UE
PUE : pico UE
FUE : femto UE

METHOD FOR PERFORMING MEASUREMENT IN CLOUD WIRELESS COMMUNICATION SYSTEM AND DEVICE FOR SAME

CROSS REFERENCE TO RELATED APPLICATIONS

This application is the National Phase of PCT International Application No. PCT/KR2014/004886, filed on Jun. 2, 2014, which claims priority under 35 U.S.C. 119(e) to U.S. Provisional Application No. 61/916,724, filed on Dec. 16, 2013, all of which are hereby expressly incorporated by reference into the present application.

TECHNICAL FIELD

This disclosure relates to a method for efficiently performing measurement and reporting the measurement by a terminal in a cloud-based wireless communication system, and a terminal/network apparatus for the same.

BACKGROUND ART

To guarantee a more stable data service such as multimedia service in future-generation mobile communication, attention has been increasingly drawn to a hierarchical cell structure or heterogeneous cell structure in which micro cells (or pico cells or femto cells) for low power/near field communication are co-located within a macro cell-based homogeneous network.

FIG. 1 illustrates a network environment having a heterogeneous cell structure.

As shown in FIG. 1, one macro cell includes Macro UEs (MUE) served by a macro eNB (MeNB). Additionally, FIG. 1 shows that pico cells, which are a kind of micro cell, are formed at a boundary region of a macro cell and served by Pico eNBs (PeNBs). UEs served by PeNBs may be represented by Pico UEs (PUEs) to distinguish the UEs from MUEs. The PeNBs, which are an example of eNBs providing services to a micro cell or small cell, may correspond to small eNBs of various types.

Since installation of additional macro eNBs is inefficient in terms of cost and complexity relative to system performance improvement, the heterogeneous network structure is expected to be further utilized through installation of micro eNBs as described above.

According to a heterogeneous network structure which is under discussion for a communication network, multiple micro cells coexist in one macro cell, and serve corresponding UEs using resources allocated thereto according to a cell coordination scheme, as shown in FIG. 1.

DISCLOSURE

Technical Problem

In a heterogeneous network environment, when the measurement operation is performed for mobility of a UE, configuration for the measurement may be different from that in a typical network. In addition, as one UE is connected to a plurality of network nodes to receive services, the measurement operations may overlap or reports thereon may overlap. Thereby, radio resource may be unnecessarily wasted.

Technical Solution

The object of the present invention can be achieved by providing a method for performing measurement by a user equipment (UE) in a cloud wireless communication system comprising one or more baseband units (BBUs) and one or more remote radio units (RRUs) connected to a specific BBU of the BBUs to directly provide a service to the UE via one or more cells. The method includes receiving a first that measurement configuration message and a second measurement configuration message from a first BBU and second BBU connected to the UE, and adding results of measurement on one or more first RRUs to be measured according to the first measurement configuration message and one or more second RRUs to be measured according to the second measurement configuration message to a first measurement report message and a second measurement report message and transmitting the same, wherein, when the first RRUs and the second RRUs comprise one or more overlapping RRUs, a result of measurement on the one or more overlapping RRUs is added to only one of the first measurement report message and the second measurement report message.

The one or more first RRUs may include one or more first serving RRUs and one or more second neighboring RRUs, wherein the one or more second RRUs may include one or more first serving RRUs and one or more second neighboring RRUs. According to one embodiment, when the one or more overlapping RRUs are included in the first serving RRUs and the second neighboring RRUs, the result of measurement on the one or more overlapping RRUs may be added to the first measurement report message. Alternatively, when the one or more overlapping RRUs are included in the first serving RRUs and the second neighboring RRUs, the result of measurement on the one or more overlapping RRUs may be added to the second measurement report message.

At least one of the first measurement report message and the second measurement report message may further contain an indicator indicating whether to deliver the result of measurement on the one or more overlapping RRUs.

In another aspect of the present invention, provided herein is a method for transmitting a measurement configuration message by a first baseband unit (BBU) in a cloud wireless communication system including one or more BBUs and one or more remote radio units (RRUs) connected to a specific BBU of the BBUs to directly provide a service to a user equipment (UE) via one or more cells. the method includes acquiring information about a second BBU configured to provide a service to a specific UE in addition to the first BBU, coordinating configuration of measurement configuration messages for the second BBU and the specific UE and transmitting a first measurement configuration message to the UE, wherein, when one or more overlapping RRUs are present between one or more first RRUs of the first BBU needed to provide a service and one or more second RRUs of the second BBU needed to provide a service, a measurement request for the one or more overlapping RRUs is added to only one of the first measurement configuration message and a second measurement configuration message, the second measurement configuration message being transmitted from the second BBU to the specific UE.

The one or more first RRUs may include one or more first serving RRUs and one or more second neighboring RRUs, wherein the one or more second RRUs may include one or more first serving RRUs and one or more second neighboring RRUs.

In this case, according to an embodiment, when the one or more overlapping RRUs are included in the first serving RRUs and the second neighboring RRUs, a measurement request for the one or more overlapping RRUs may be added to the first measurement report message. According to another embodiment, when the one or more overlapping RRUs are included in the first serving RRUs and the second neighboring RRUs, a measurement request for the one or more overlapping RRUs may be added to the second measurement configuration message.

The coordinating may include transmitting an RRC information request message contain information about the first RRUs to the second BBU, and receiving an RRC information response message containing information about the second RRUs from the second BBU.

Herein, at least one of the RRC information request message and the RRC information response message may further contain an indicator for requesting delivery of result of measurement on the one or more overlapping RRU.

In another aspect of the present invention, provided herein is a user equipment (UE) for performing measurement in a cloud wireless communication system including one or more baseband units (BBUs) and one or more remote radio units (RRUs) connected to a specific BBU of the BBUs to directly provide a service to the UE via one or more cells. The UE includes a receiver configured to receive a first that measurement configuration message and a second measurement configuration message from a first BBU and second BBU connected to the UE, a processor connected to the receiver and configured to add results of measurement on one or more first RRUs to be measured according to the first measurement configuration message and one or more second RRUs to be measured according to the second measurement configuration message to a first measurement report message and a second measurement report message, and a transmitter configured to transmit the first measurement report message and the second measurement report message to the first BBU and the second BBU, wherein the processor is configured to add, when the first RRUs and the second RRUs include one or more overlapping RRUs, a result of measurement on the one or more overlapping RRUs to only one of the first measurement report message and the second measurement report message.

In another aspect of the present invention, provided herein is an apparatus capable of operating as a first baseband unit (BBU) for transmitting a measurement configuration message to a specific user equipment (UE) in a cloud wireless communication system including one or more BBUs and one or more remote radio units (RRUs) connected to a specific BBU of the BBUs to directly provide a service to a UE via one or more cells. The apparatus includes a processor configured to acquire information about a second BBU configured to provide a service to a specific UE in addition to the first BBU and to coordinate configuration of measurement configuration messages for the second BBU and the specific UE and configure a first measurement configuration message to be transmitted to the specific UE, and a transmitter connected to the processor and configured to transmit the first measurement configuration message to the specific UE, wherein the processor is configured to add, when one or more overlapping RRUs are present between one or more first RRUs of the first BBU needed to provide a service and one or more second RRUs of the second BBU needed to provide a service, a measurement request for the one or more overlapping RRUs to only one of the first measurement configuration message and a second measurement configuration message, the second measurement configuration message being transmitted from the second BBU to the specific UE.

Advantageous Effects

According to embodiments of the present invention described above, load according to the measurement operation of a UE may be reduced in a heterogeneous network environment, particularly, a cloud network environment.

BEST MODE

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. In some instances, well-known structures and devices are omitted in order to avoid obscuring the concepts of the present invention and important functions of the structures and devices are shown in block diagram form.

As described above, the following description relates to a method for efficiently performing measurement and reporting the measurement by a UE in a cloud-based wireless communication system To this end, the concept of RRH of a cloud-based wireless communication system will be described first.

Figure 2:
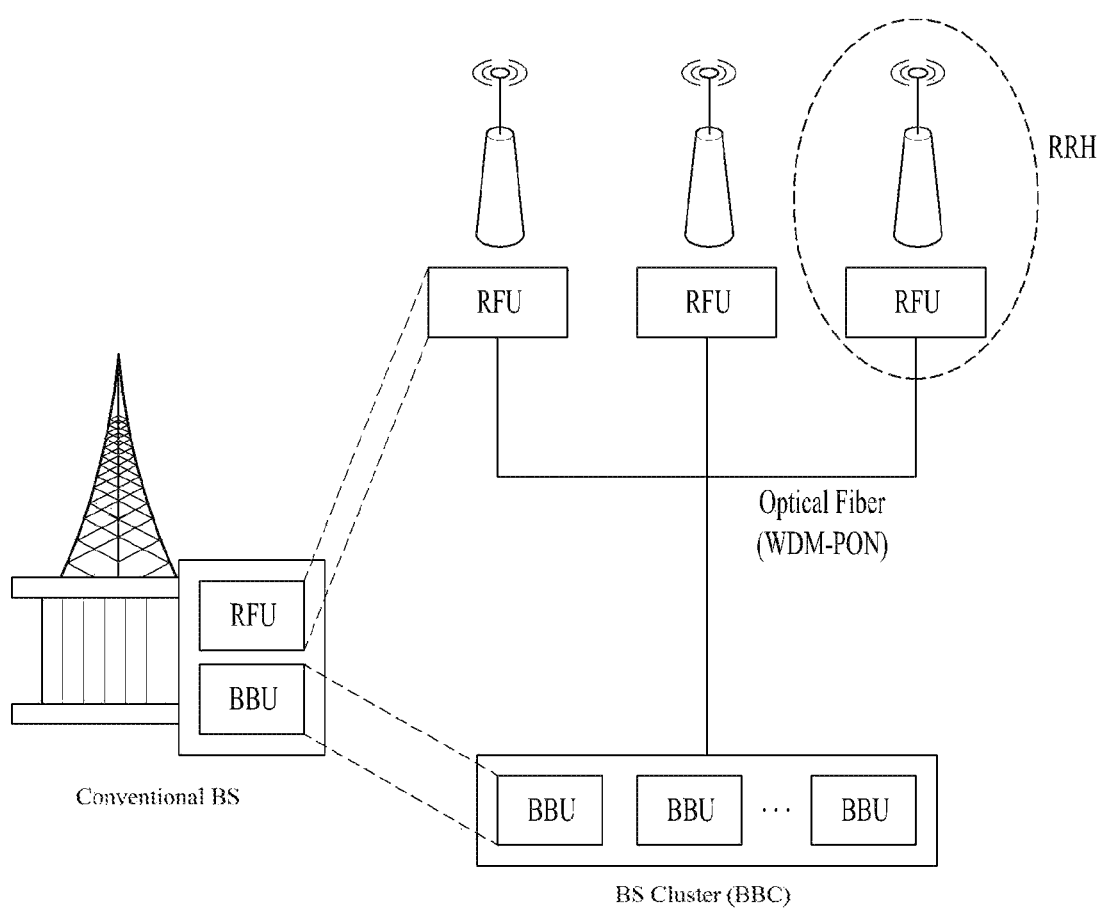
FIG. 2 illustrates the concept of an RRH of a cloud-based wireless communication system.

FIG. 2 illustrates the concept of an RRH of a cloud-based wireless communication system.

Three core technologies enabling implementation of a network cloud may be Remote Radio Head (RRH)/CoMP, software modem technology and cloud computing. In the field of wireless access networking, the most important thing needed to implement the network cloud is introduction of RRH. The RRH, which is a very important element in terms of wireless transmission, serves as a factor causing innovative change of the radio access network structure.

The RRH, which was originally developed as a kind of optical relay, has recently begun to be used as a core element for implementation of a centralized eNB. As shown in FIG. 2, introduction of RRH has physically divided a radio frequency unit (RFU) or remote radio unit (RRU) from a baseband unit (BBU), and thus physical eNBs need not be distributed anymore. As shown in FIG. 2, the functions of the conventional eNBs are divided into RFU or RRU for transmission and reception of radio signals and BBU for processing within an eNB, and both units may be connected by an optical fiber (WDM-PON). However, embodiments of the present invention need not be limited thereto.

For a cloud access network that has been recently introduced, one apparatus is allowed to manage the network in operative connection with hundreds of RRHs. As a result, a cell conceptually different from the conventional cell has been established.

In all communication systems up to 4G, all radio access has been defined based on cells. However, with the structural change as described above, a new concept of cell is needed. In current 3GPP, various implementation scenarios for a situation in which the RRH and an MeNB coexist are under discussion in the CoMP (Coordinated Multi-Point) Work Item of Release 11. Recently, research has been conducted on the concept of multiple cells sharing one RRH as in the case of a shared antenna system (SAS). The concept of dynamically changing a cell region by coordinating an RRH cluster according to situation is also under study.

With this trend, attention has been increasingly drawn to a Cloud Radio Access Network (C-RAN) project.

Figure 3:
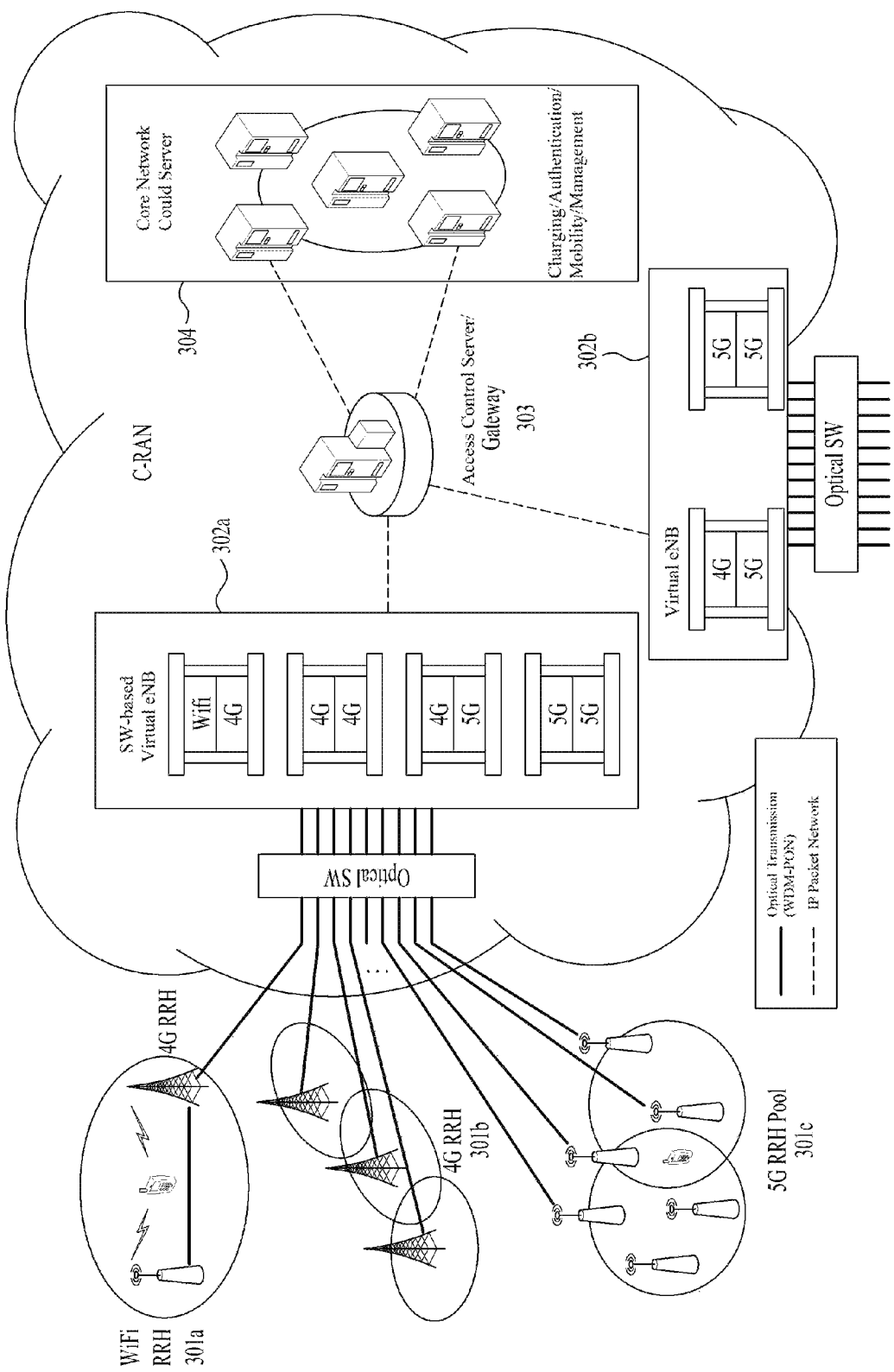
FIG. 3 illustrates the concept of a cloud radio access network to which the present invention is applied.

FIG. 3 illustrates the concept of a cloud radio access network to which the present invention is applied.

As shown in FIG. 3, multiple RRHs 301a, 301b and 301c may access a virtual eNB 302a through an optical access apparatus. The RRHs may use various radio access schemes including LTE, HSPA and WiMAX/Wi-Fi. The virtual eNBs 302a and 302b may be implemented by software, using various radio access technologies including LTE, HSPA and WiMAX/Wi-Fi. Services of the virtual eNBs 302a and 302b may be controlled as the virtual eNBs 302a and 302b are connected to an access control server 303 and a core network could server 304.

RRHs need to establish a relationship of one-to-one correspondence with virtual eNBs. As shown in FIG. 3, one or more RRHs 301a, 301b and 301c may be controlled through one virtual eNB 302a. Thereby, while the cell region is fixed in conventional cases, cells may be dynamically allocated in C-RAN by dynamically changing the RRH cluster.

Figure 1:
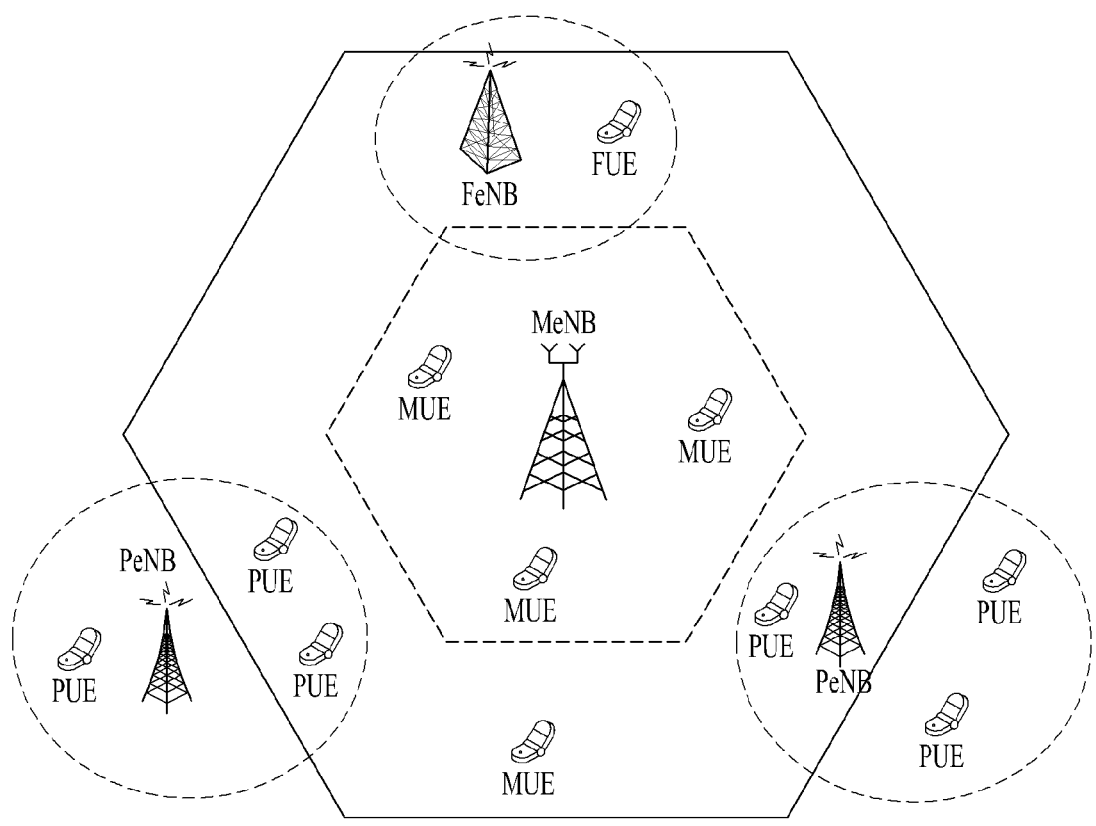
FIG. 1 illustrates a network environment having a heterogeneous cell structure.

The method proposed in the embedment described above assumes the C-RAN SAS environment for simplicity of description. This method may also be applied to a small cell environment or the heterogeneous network environment described above in relation to FIG. 1.

Hereinafter, various network deployment structures will be discussed as specific examples to which the embodiment described above is applicable.

Figure 4:
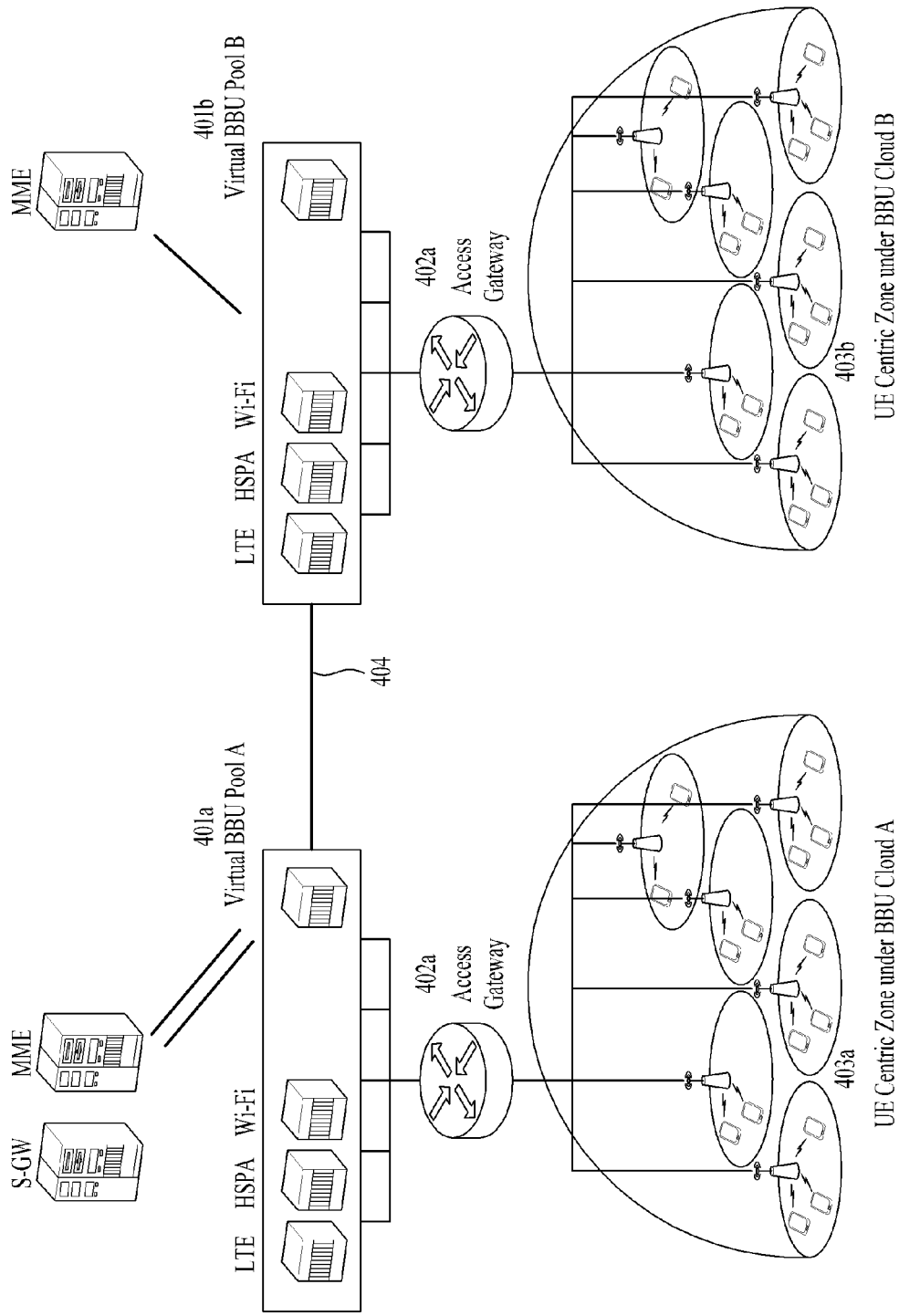
FIG. 4 illustrates a cloud RAN structure to which an embodiment of the present invention is applicable.

FIG. 4 illustrates a cloud RAN structure to which an embodiment of the present invention is applicable. Specifically, FIG. 4 shows the structure of a cloud RAN at which the 5G wireless network is oriented.

The 5G cloud RAN may have virtual BBU pools 401a and 401b, and each BBU pool 401a, 401b may include a plurality of BBUs. Each BBU pool 401a, 401b may be associated with an SAS RRU 403a, 403b supporting Multi-RAT, via an access gateway (GW) 402a, 402b.

BBUs in a virtual BBU are defined as BBUs supporting multiple RATs. One RRU may be associated with one or more BBUs at a specific time, and controlled by the BBU associated therewith. Connection between RRUs and BBUs in a virtual BBU pool assumes ideal backhaul, and one virtual BBU pool may be connected with another virtual BBU pool via an X2-like interface 404. An RRU may be time-variably switched from one BBU to another according to situation (e.g., load, use of resources, etc.).

In the wireless network environment, UEs are assumed to have mobility. Preferably, in order to ensure mobility of UEs, UEs periodically/aperiodically perform measurement on neighboring cells and report the measurement to the network.

Figure 5:
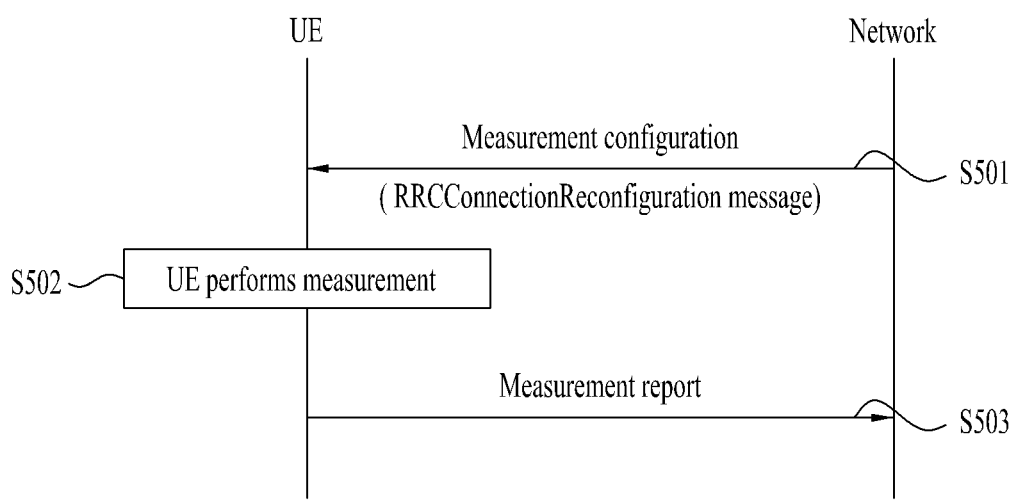
FIG. 5 is a flowchart illustrating a basic UE measurement procedure to which the present invention is applicable.

FIG. 5 is a flowchart illustrating a basic UE measurement procedure to which the present invention is applicable.

A UE may receive measurement configuration information about an object on which measurement is to be performed, a measurement period, and the like from the network through an RRC message (S501). Upon receiving the measurement configuration information, the UE may perform measurement on a neighboring cell in a homogeneous/heterogeneous network according to the configuration information (S502). After performing the measurement, the UE may report a result of measurement to the network side (S503), and the network may provide a service for ensuring mobility of the UE such as determination of handover of the UE, based on the report.

Table 1 below shows an example of a measurement report message which is reported to the network by the UE.

TABLE 1

| | |
|---|---|
| MeasResults ::= | SEQUENCE { |
|   measId |   MeasId, |
|   measResultPCell |   SEQUENCE { |
|     rsrpResult |     RSRP-Range, |
|     rsrqResult |     RSRQ-Range |
|   }, | |
|   measResultNeighCells |   CHOICE { |
|     measResultListEUTRA |     MeasResultListEUTRA, |
|     measResultListUTRA |     MeasResultListUTRA, |
|     measResultListGERAN | |
|   MeasResultListGERAN, | |
|     measResultsCDMA2000 | |
|   MeasResultsCDMA2000, | |
|     ... | |
|   } | |
| |   OPTIONAL, |
| ..., | |
| [[   measResultForECID-r9 |   MeasResultForECID-r9 |
|   OPTIONAL | |
| ]], | |
| [[   locationInfo-r10 |   LocationInfo-r10 |
|   OPTIONAL, | |
|   measResultServFreqList-r10 |   MeasResultServFreqList-r10 |
|   OPTIONAL | |
| ]] | |

TABLE 1-continued

```
}
MeasResultListEUTRA ::=           SEQUENCE (SIZE (1..maxCellReport))
OF MeasResultEUTRA
    MeasResultEUTRA ::=   SEQUENCE {
        physCellId                        PhysCellId,
        cgi-Info                          SEQUENCE {
            cellGlobalId                      CellGlobalIdEUTRA,
            trackingAreaCode                  TrackingAreaCode,
            plmn-IdentityList                 PLMN-IdentityList2
                OPTIONAL
        }
                                          OPTIONAL,
        measResult                        SEQUENCE {
            rsrpResult                        RSRP-Range
                            OPTIONAL,
            rsrqResult                        RSRQ-Range
                            OPTIONAL,
            ...,
            [[  additionalSI-Info-r9          AdditionalSI-Info-r9
                OPTIONAL
            ]]
        }
    }
}
MeasResultServFreqList-r10 ::=    SEQUENCE (SIZE (1..maxServCell-r10)) OF
MeasResultServFreq-r10
    MeasResultServFreq-r10 ::=        SEQUENCE {
        servFreqId-r10                    ServCell인덱스 r10,
        measResultSCell-r10               SEQUENCE {
            rsrpResultSCell-r10               RSRP-Range,
            rsrqResultSCell-r10               RSRQ-Range
        }
                                          OPTIONAL,
        measResultBestNeighCell-r10       SEQUENCE {
            physCellId-r10                    PhysCellId,
            rsrpResultNCell-r10               RSRP-Range,
            rsrqResultNCell-r10               RSRQ-Range
        }
                                          OPTIONAL,
        ...
    }
MeasResultListUTRA ::=            SEQUENCE (SIZE (1..maxCellReport))
OF MeasResultUTRA
    MeasResultUTRA ::=    SEQUENCE {
        physCellId                        CHOICE {
            fdd
PhysCellIdUTRA-FDD,
            tdd
PhysCellIdUTRA-TDD
        },
        cgi-Info                          SEQUENCE {
            cellGlobalId                      CellGlobalIdUTRA,
            locationAreaCode                  BIT STRING (SIZE
(16))           OPTIONAL,
            routingAreaCode                   BIT STRING (SIZE (8))
                OPTIONAL,
            plmn-IdentityList                 PLMN-IdentityList2
                OPTIONAL
        }
                                          OPTIONAL,
        measResult                        SEQUENCE {
            utra-RSCP                         INTEGER (-
5..91)           OPTIONAL,
            utra-EcN0                         INTEGER
(0..49)                 OPTIONAL,
            ...,
            [[  additionalSI-Info-r9          AdditionalSI-Info-r9
                OPTIONAL
            ]]
        }
    }
}
MeasResultListGERAN ::=           SEQUENCE (SIZE (1..maxCellReport))
OF MeasResultGERAN
    MeasResultGERAN ::=   SEQUENCE {
        carrierFreq                       CarrierFreqGERAN,
        physCellId                        PhysCellIdGERAN,
        cgi-Info                          SEQUENCE {
            cellGlobalId                      CellGlobalIdGERAN,
            routingAreaCode                   BIT STRING (SIZE (8))
                OPTIONAL
        }
```

TABLE 1-continued

```
                                            OPTIONAL,
    measResult                          SEQUENCE {
        rssi                                INTEGER
(0..63),
        ...
    }
}
MeasResultsCDMA2000 ::=            SEQUENCE {
    preRegistrationStatusHRPD          BOOLEAN,
    measResultListCDMA2000                 MeasResultListCDMA2000
}
MeasResultListCDMA2000 ::=         SEQUENCE (SIZE (1..maxCellReport))
OF MeasResultCDMA2000
    MeasResultCDMA2000 ::=   SEQUENCE {
        physCellId                         PhysCellIdCDMA2000,
        cgi-Info                           CellGlobalIdCDMA2000
            OPTIONAL,
        measResult                     SEQUENCE {
            pilotPnPhase                   INTEGER
(0..32767)                     OPTIONAL,
            pilotStrength                  INTEGER (0..63),
            ...
        }
    }
    MeasResultForECID-r9 ::=    SEQUENCE {
        ue-RxTxTimeDiffResult-r9           INTEGER (0..4095),
        currentSFN-r9                      BIT STRING (SIZE
(10))
    }
    PLMN-IdentityList2 ::=             SEQUENCE (SIZE (1..5)) OF PLMN-
Identity
    AdditionalSI-Info-r9 ::=            SEQUENCE {
        csg-MemberStatus-r9                ENUMERATED {member}
            OPTIONAL,
        csg-Identity-r9                    CSG-Identity
                    OPTIONAL
    }
-- ASN1STOP
```

As shown in Table 1 above, the UE may report, to a network associated with the UE, IDs of the neighboring cells on which the UE has performed measurement, qualities of signals measured in the neighboring cells, and the like.

The basic measurement operation of the UE described above may be more complex in a C-RAN SAS environment. Specifically, the UE may be associated with a plurality of RRUs/a plurality of BBUs simultaneously and be provided with services. Thereby, the concept of the neighboring cell may also change. This is because the concept of coverage of the UE changes in the C-RAN SAS environment as described below.

Figure 6:
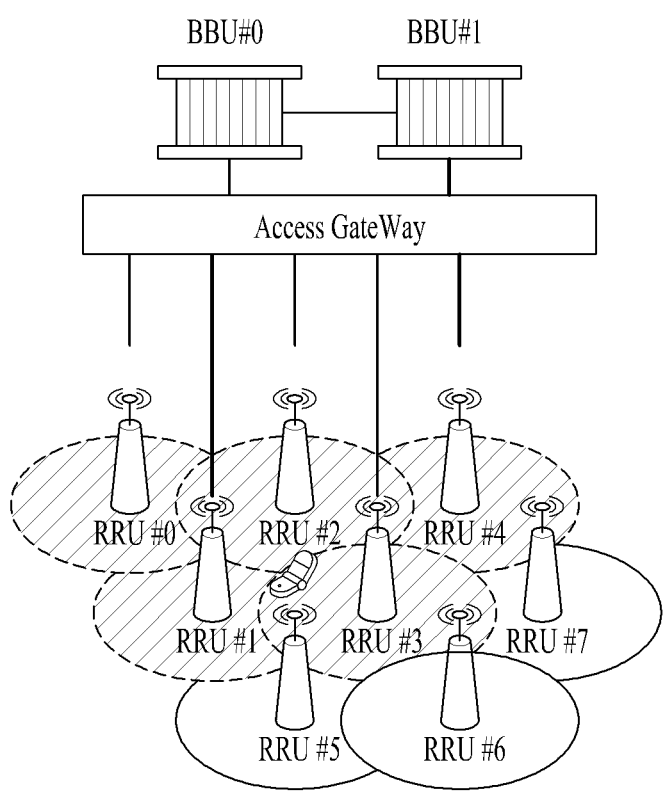
FIGS. 6 and 7 illustrate the concept of coverage of a UE in a C-RAN SAS environment to which the present invention is applicable.
Figure 7:
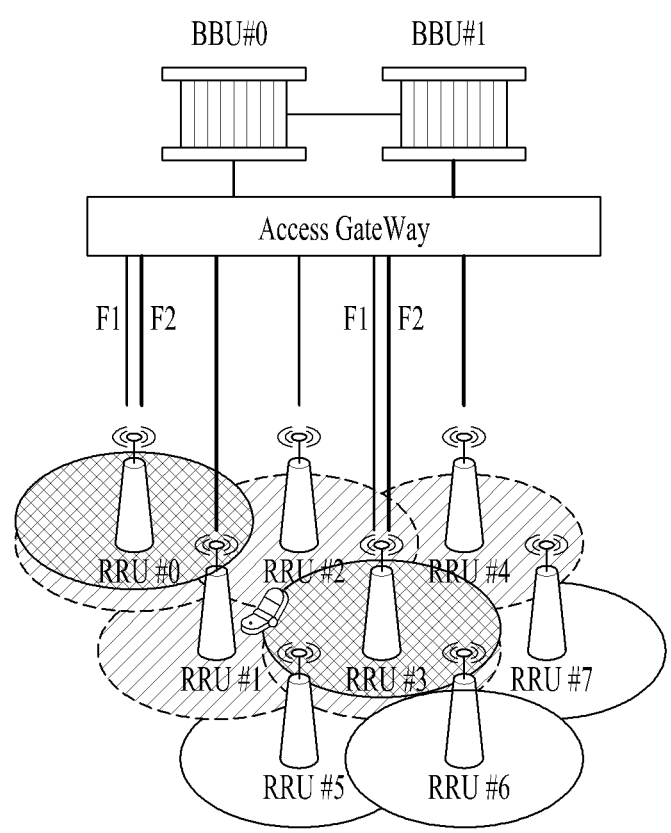

FIGS. 6 and 7 illustrate the concept of coverage of a UE in a C-RAN SAS environment to which the present invention is applicable.

Many technologies intended to provide UE centered coverage to each UE to provide services of a uniform quality to UEs anytime and anywhere in the C-RAN SAS environment have been developed. In the C-RAN SAS environment, BBUs may be time-variably associated with RRUs. To provide optimum coverage to a UE, the UE may transmit and receive signals/data through RRUs associated with multiple BBUs rather than one BBU. The UE connected to the RRU(s) associated with multiple BBUs may perform measurement not only on the serving RRUs (or cells/carriers) thereof but also on neighboring RRUs (or cells/carriers) of the serving RRU (or cell/carrier), and report a measurement result to the serving RRU (or cell/carrier) thereof.

Referring to FIG. 6, the coverage of a specific UE may be configured using specific RRUs (RRU #0, RRU #1, RRU #2, RRU #3 and RRU #4 in FIG. 6) connected to BBU #0 and BBU #1. In FIG. 6, the coverage of the specific UE is indicated by a dotted line. The specific UE may measure the serving cell thereof and a neighboring cell, and report a result of the measurement to BBU(s) associated with the serving RRUs. In this case, as shown in FIG. 6, BBUs and RRUs may be time variably associated without any local relation therebetween.

Alternatively, as shown in FIG. 7, the coverage of a UE (a transmission range of a cell or carrier supporting the UE) may be configured in a carrier unit rather than an RRU unit. In this case, other BBUs may transmit other carriers through a specific RRU or perform transmission using the same carrier. For example, as shown in FIG. 7, BBU #0 and BBU #1 may be connected to RRU #0, and carrier f1 may be transmitted through BBU #0, and carrier f2 may be transmitted through BBU #1. In this case, only carrier f2 transmitted through RRU #0 on behalf of the specific UE may be configured as the coverage of the specific UE. In addition, in RRU #3, when BBU #0 transmits carrier f1 and BBU #1 transmits carrier f2, only carrier f2 may be configured as a cell (or carrier) supporting the specific UE.

In accordance with one aspect of the present invention, a method for a measurement procedure of the UE in a C-RAN SAS environment is proposing consideration of the situation as described above. In particular, the proposed method may also be used to reduce signaling overhead of the UE.

Method proposed in the following description may be distinguished from each other according to whether or not coordination between multiple BBUs is performed when the multiple BBUs support a specific UE.

Embodiment 1—Coordination Between Multiple BBUs is not Performed

Each BBU may transmit information about a neighboring cell (or carrier, RRU, etc.) of RRUs associated with a BBU within the coverage configured for a specific UE. For example, as shown in FIG. 6, the specific UE may transmit and receive signals via RRU #0, RRU #2 and RRU #3 associated with BBU #0 and via RRU #1 and RRU #4 associated with BBU #1. BBU #0 and BBU #1 may transmit information about RRUs associated therewith and neighboring RRUs of the associated RRUs to the UE, without performing coordination of information about the RRUs associated therewith, information about the neighboring RRUs of the associated RRUs, or information about serving RRUs for respective BBUs of any UE and neighboring RRUs of the serving RRUs.

In the example illustrated in FIG. 5, BBU #0 may transmit, to a UE, information about RRU #1, RRU #4, RRU #5, RRU #6 and RRU #7 which are RRUs neighboring RRUs associated with RRU #0, RRU #2 and RRU #3, which are RRUs associated with BBU #0 (on the assumption that only 1 tier is a neighboring RRU, and is pre-recognized through a procedure of acquiring information about RRUs neighboring RRUs associated with a BBU).

This embodiment may be implemented irrespective of a method of acquiring information about RRUs neighboring RRUs associated with a BBU. BBU #1 may transmit, to the UE, information about RRU #0, RRU #2, RRU #3, RRU #5 and RRU #7 which are RRUs neighboring RRUs associated with RRU #1 and RRU #4 associated with the UE. Similar to the message transmitted in S501, this information may be transmitted via RRC configuration messages transmitted by the respective BBUs, and may carry a serving cell list and neighboring cell list each including RRU ID, PCID, and cell ID which identify each RRU and/or cell (or carrier). While it is illustrated for simplicity that the operation is performed in the RRU unit, the operation may be performed in a cell/carrier unit rather than the RRU unit by applying the aforementioned IDs.

Alternatively, each BBU may use an RRC message to transmit, to a UE, measurement RRUs and measurement report RRUs configured using information about serving RRUs of a BBU for the UE and RRUs neighboring the serving RRUs. While it is illustrated in this embodiment that each BBU configures a list of RRUs serving a UE and RRUs neighboring the serving RRUs as measurement RRUs and measurement report RRUs, for simplicity of description, the serving RRUs and a part of the RRUs neighboring the serving RRUs may be configured as measurement and measurement report RRUs.

Upon receiving information about measurement and information about the measurement report RRUs, the UE may perform measurement on the RRUs configured by the BBUs, and transmit corresponding result values to the BBU(s). In this case, when the UE performs measurement reporting about RRUs neighboring the serving RRUs configured by the respective BBUs, the information about the RRUs configured by one BBU may fully or partially overlap the information about the RRUs configured by another BBU. That is, in the example illustrated in FIG. 6, information about {RRU #5, RRU #7} of the information about neighboring RRUs may be included in first the configuration information of BBU #0 and second configuration information of the BBU #1, and the information about RRU #1 and RRU #4 for a serving RRU associated with BBU #1 may overlap the information about RRU #1 and RRU #4 included in the information about neighboring RRUs of an RRU associated with BBU #0. Similarly, the information about RRU #0, RRU #2 and RRU #3 for a serving RRU associated with BBU #0 may overlap the information about RRU #0, RRU #2 and RRU #3 in the information about RRUs neighboring the RRUs associated with BBU #1.

Association between BBUs and RRUs has little relevance to areas (namely, even if RRUs neighbor each other, they are not associated with the same BBU), and this embodiment assumes neighboring RRUs as 1 tier. However, if neighboring RRUs are configured in a wider range, the UE is likely to transmit the aforementioned overlapping information. Accordingly, this embodiment proposes a method for a UE to more effectively perform measurement reporting while avoiding unnecessary measurement/measurement reporting resulting from overlapping of information.

A UE may acquire information about RRUs associated with each BBU from multiple BBUs using SIB information transmitted via RRUs (on a specific carrier). That is, the SIB information may carry an identifier for distinguishing between BBUs and RRUs in consideration of the C-RAN SAS environment. Using this identifier, the UE may identify an RRU and BBU with which a specific RRU or carrier is associated in transmitting a signal. In addition, the UE may receive a neighboring cell list to be measured from a serving cell and/or RRU (or BBU) thereof, performed measurement on the cells and report a corresponding result value.

For example, the example described above may be summarized as shown in Table 2.

TABLE 2

|  | BBU #0 | BBU #1 |
| --- | --- | --- |
| Serving RRUs | {RRU #0, RRU #2, RRU #3} | {RRU #1, RRU #4} |
| Neighboring RRUs | {RRU #1, RRU #4, RRU #5, RRU #6, RRU #7} | {RRU #0, RRU #2, RRU #3, RRU #5, RRU #7} |

As shown in Table 2, RRU #0, RRU #2 and RRU #3, which are serving RRUs of BBU #0, are also included in the list of RRUs neighboring RRUs associated with BBU #1, and RRU #1 and RRU #4 included in the list of RRUs neighboring RRSs associated with BBU #0 overlap the serving RRUs associated with BBU #1. In addition, RRU #5 and RRU #7 which are in the list of RRUs neighboring the RRUs associated with BBU #0 overlap the list of RRUs neighboring the RRUs associated with BBU #1.

When a UE receives a measurement configuration message for measurement and measurement report RRUs from each of BBU #0 and BBU #1 for information about legacy Rel-9/10/11 as shown in Table 2, the UE measures signals of RRUs configured by each BBU and reports the result of measurement on the RRUs configured by each BBU. When configuration is established as shown in Table 2, the UE needs to the same result of measurement on the RRU #0, RRU #2, RRU #3, RRU #1, RRU #4, RRU #5, RRU #7 to BBU #0 and BBU #1. According to an embodiment, to reduce such signaling overhead of the UE, the UE may transmit an overlapping measurement result to only one BBU. According to an embodiment, the UE may not perform the overlapping measurement, and may perform measurement on an overlapping RRU only once, and report the measurement result to one BBU.

Given the example shown in FIG. 2, a conventional UE reports a result of measurement on 8 RRUs to BBU #0, and reports a result of measurement on 7 RRUs to BBU #1. Thereby, the UE reports measurement results for 15 RRUs. With the method proposed in this embodiment is used to reduce such signaling overhead of the UE, the UE is allowed to report only measurement or measurement results of 8 RRUs.

There may be various methods a UE may use to perform measurement and report the measurement.

Example 1

A UE may determine whether or not RRU(s) contained in measurement configuration message(s) transmitted from one or more serving BBUs overlap each other. A measurement result of an overlapping RRU may be transmitted to a specific BBU alone. Herein, the specific BBU may be a BBU for which the shortest reporting period of the RRU is set. On the other end, a measurement result of a non-overlapping RRU may be transmitted to a BBU to which the result of measurement of the RRU is configured to be reported. In this case, the measurement result of the overlapping RRU is information needed by other BBUs having instructed measurement of the same RRU as well, and therefore the specific BBU receiving the measurement result needs to deliver the overlapping information to other BBUs. To this end, the UE may transmit an indicator instructing delivery of the overlapping information. The UE may also transmit information indicating BBUs to which the overlapping information should be transmitted.

For example, in the aforementioned procedure, assuming that measurement reporting on serving RRUs is prioritized over measurement reporting on neighboring RRUs (this assumption may be predefined, or indicated by the network when measurement is configured), measurement reports may be transmitted to the respective BBUs, and overlapping information may be transmitted to a specific BBU.

TABLE 3

|  | BBU #0 | BBU #1 |
|---|---|---|
| Serving RRUs | {RRU #0, RRU #2, RRU #3} | {RRU #1, RRU #4} |
| Neighboring RRUs | {RRU #5, RRU #6, RRU #7} |  |

As an example, it may be assumed that serving RRUs are prioritized over the list of neighboring RRUs. Then, in the example described above, measurement reports on the serving RRUs of BBU #0 and BBU #1 may be transmitted to the correspond BBUs, while a measurement report on RRU #5 and RRU #7 which are overlapping neighboring RRUs for BBU #0 and BBU #1 may be transmitted to BBU #0 but not to BBU #1. Meanwhile, the UE may transmit a measurement report on RRU #6, which is a non-overlapping neighboring RRU of BBU #0 to BBU #0.

Upon receiving the measurement reports, BBU #0 may transmit information about RRU #0, RRU #2, RRU #3, RRU #5 and RRU #7 to BBU #1. BBU #1 receiving the measurement report from the UE may transmit a measurement result about RRU #1 and RRU #4. To this end, when the UE transmits measurement reports to BBU #0, the UE may announce that BBU #0 should transmit the information to BBU #1.

When the UE performance measurement reporting in legacy LTE Rel-9/10/11, the UE transfers PCID of a neighboring cell, CellGlobalIdEUTRA, a signal measurement result (e.g., RSRP, RSRQ), and the like. In the C-RAN SAS environment as illustrated in this embodiment, information about identifiers for distinguishing among BBUs and RRUs such as IDs of BBUs to receive results of measurement of RRUs and RRU IDs and an indicator indicating whether a measurement result is a measurement result about a serving RRU of a BBU to receive the measurement result or a measurement result about a neighboring RRU may be additionally transmitted. In this case, a specific RRU (or cell, carrier) may be a serving RRU of multiple BBUs or a neighboring RRU of the serving RRU, and accordingly IDs of BBUs to receive the result of measurement of the specific RRU and an indicator indicating whether the specific RRU is the serving RRU of the UE or a neighboring RRU may be transmitted as additional information for multiple BBUs.

For example, with the aforementioned method, when one RRU is an RRU neighboring an RRU associated with two different RRUs, a UE may transmit the following serving cell measurement result and neighbor cell measurement result to BBU #0.

Serving Cell (RRU) Measurement Result

{(RRU #0 (or cell index, cell ID, PCID, CellGlobalIdEUTRA, etc.), rsrp, rsrq, BBU ID (BBU #1) to receive the result of measurement of an RRU, '1' indicating a neighboring RRU), (RRU #2 (or cell index, cell ID, PCID, etc.), rsrp, rsrq, BBU ID (BBU #1) to receive the result of measurement of an RRU, '1' indicating a neighboring RRU), (RRU #3 (or cell index, cell ID, PCID, etc.), rsrp, rsrq, BBU ID (BBU #1) to receive the result of measurement of an RRU, '1' indicating a neighboring RRU)}.

Neighboring Cell (RRU) Measurement Result

{(RRU #5 (or cell index, cell ID, PCID, CellGlobalIdEUTRA, etc.), rsrp, rsrq, BBU ID (BBU #1) to receive the result of measurement of an RRU, '1' indicating a neighboring RRU), (RRU #6 (or cell index, cell ID, PCID, CellGlobalIdEUTRA, etc.), rsrp, rsrq), (RRU #7 (or cell index, cell ID, PCID, CellGlobalIdEUTRA, etc.), rsrp, rsrq, BBU ID (BBU #1) to receive the result of measurement of an RRU, '1' indicating a neighboring RRU)}.

In the above example, it is assumed that the indicator indicating whether the RRU is a neighboring RRU or a serving RRU indicates a neighboring RRU when it is set to '1', and indicates a serving RRU when it is set to '0'. Upon receiving the measurement report from the UE, BBU #0 may recognize that RRU #0, RRU #2 and RRU #3 are RRUs neighboring RRUs associated with BBU #1 and that RRU #5 and RRU #7 are RRUs associated with BBU #1.

BBU #0 receiving information about a BBU to receive the measurement result of an RRU and an indicator indicating whether the RRU is an neighboring RRU of a UE or a serving RRU of the UE in a measurement report message of the UE may recognize that BBU #0 should transmit, to BBU #1, the measurement results of the RRUs for which the corresponding field has been transmitted. BBU #0 may deliver the measurement information reported by the UE and the measured UE identifiers to BBU #1. At this time, an indicator indicating whether the respective RRUs are serving RRUs of BBU #0 or neighboring RRUs may be additionally transmitted. Upon receiving the measurement information and indicator, BBU #1 may recognize that RRU #0, RRU #2, RRU #3, RRU #5 and RRU #7 are neighboring RRUs of serving RRUs of the UE and that the result of measurement of the neighboring RRUs performed by the UE has been received. Thereby, when a predefined measurement event is triggered, BBU #1 may adjust the coverage for the UE based on the recognition. BBU #1 may also recognize whether the RRUs are serving RRUs of BBU #0 or neighboring RRUs of the serving RRUs of BBU #0. That is, BBU #1 may recognize that RRU #0, RRU #2 and RRU #3 are serving RRUs of BBU #0 and that RRU #5 and RRU #7 are neighboring RRUs of the serving RRUs.

The UE may also transmit a measurement report to BBU #1. In this case, the measurement report may be transmitted to BBU #1 via an RRU associated with BBU #1. In this case, the transmitted report may include the following information.

Serving Cell (RRU) Measurement Result

{(RRU #1 (or cell index, cell ID, PCID, CellGlobalIdEUTRA, etc.), rsrp, rsrq, BBU ID (BBU #0) to receive the measurement result of the RRU, '1' indicating a neighboring RRU), (RRU #4 (or cell index, cell ID, PCID, etc.), rsrp, rsrq, BBU ID (BBU #0) to receive the measurement result of the RRU, '1' indicating a neighboring RRU)}

In the examples above, serving RRUs are exemplarily prioritized over neighboring RRUs for simplicity of description. In some cases, the neighboring RRUs may be prioritized. When priorities of serving RRUs and neighboring are predetermined, a UE may omit the indicator indicating whether a specific RRU is a serving RRU of a BBU to receive the measurement result of the RRU or a neighboring RRU in transmitting a measurement report. BBU #1 receiving the measurement reports may recognize that BBU as a wants you to transmit the measurement results of RRU #1 and RRU #4 to BBU #0 and that RRU #1 and RRU #4 are neighboring RRUs of the serving RRUs of BBU #0. The UE may deliver the measurement report information and measured the UE identifiers to BBU #1. In this case, an indicator whether the respective RRUs are serving RRUs of BBU #0 or neighboring RRUs of the serving RRUs may be additionally transmitted. Upon receiving the identifiers and the indicator, BBU #0 may recognize RRU #1 and RRU #4 and that RRU #1 and RRU #4 are neighboring RRUs of the serving RRUs of BBU #0. In this way, it may be recognize that the result of measurement of neighboring RRUs performed by the UE has been received. Using this recognition, BBU #0 they are just the coverage for the UE when a predefined measurement event is triggered.

Example 2

A UE may determine whether or not RRU(s) contained in measurement configurations transmitted from one more serving BBUs overlap each other. A measurement result of all RRUs including the overlapping RRUs (including a serving RRU and neighboring RRU) may be transmitted only to a specific BBU. Herein, the specific BBU to perform reporting may be determined according to a measurement reporting period, the number of overlapping RRUs and the number of non-overlapping RRUs. For example, when each BBU establishes measurement configuration of overlapping RRUs, a UE may reference the measurement reporting periods of transmission and transmit a measurement result to a BBU having a short measurement reporting period. Alternatively, the UE may transmit the measurement result to a BBU having a larger number of RRUs overlapping RRUs of other BBUs among the RRUs for which measurement configuration has been established. Alternatively, the UE may check the number of non-overlapping RRUs for the respective BBUs and transmit the measurement result to a BBU having a larger number of non-overlapping RRUs. In addition, since all measurement results are transmitted to a specific BBU, the UE needs to inform the specific BBU of BBUs to which measurement result of RRUs are to be transmitted.

In this example, a UE may transmit measurement reports only to specific BBUs as shown in Table 4 below.

TABLE 4

|  | BBU #0 | BBU #1 |
|---|---|---|
| Serving RRUs | {RRU #0, RRU #1 RRU #2, RRU #3, RRU #4} | |
| Neighboring RRUs | {RRU #5, RRU #6, RRU #7} | |

As shown in Table 4, the UE may transmit not only the measurement results of serving RRUs of BBU #1 but also information about RRUs neighboring the serving RRUs to BBU #0.

Serving Cell (RRU) Measurement Result

{(RRU #1 (or cell index, cell ID, PCID, CellGlobalIdEUTRA, etc.), rsrp, rsrq, BBU ID (BBU #1) to receive the result of measurement of an RRU, '0' indicating a serving RRU), (RRU #4 (or cell index, cell ID, PCID, etc.), rsrp, rsrq, BBU ID (BBU #1) to receive the result of measurement of an RRU, '0' indicating a serving RRU), (RRU #0 (or cell index, cell ID, PCID, CellGlobalIdEUTRA, etc.), rsrp, rsrq, BBU ID (BBU #1) to receive the result of measurement of an RRU, '1' indicating a neighboring RRU), (RRU #2 (or cell index, cell ID, PCID, CellGlobalIdEUTRA, etc.), rsrp, rsrq, BBU ID (BBU #1) to receive the result of measurement of an RRU, '1' indicating a neighboring RRU), (RRU #3 (or cell index, cell ID, PCID, CellGlobalIdEUTRA, etc.), rsrp, rsrq, BBU ID (BBU #1) to receive the result of measurement of an RRU, '1' indicating a neighboring RRU)}

Neighboring Cell (RRU) Measurement Result

{(RRU #5 (or cell index, cell ID, PCID, CellGlobalIdEUTRA, etc.), rsrp, rsrq, BBU ID (BBU #1) to receive the result of measurement of an RRU, '1' indicating a neighboring RRU), (RRU #6 (or cell index, cell ID, PCID, CellGlobalIdEUTRA, etc.), rsrp, rsrq), (RRU #7 (or cell index, cell ID, PCID, CellGlobalIdEUTRA, etc.), rsrp, rsrq, BBU ID (BBU #1) to receive the result of measurement of an RRU, '1' indicating a neighboring RRU)}

As shown in Table 4, a BBU #0 receiving a measurement report from a UE via an RRU associated therewith may recognize that RRU #1 and RRU #4 are serving RRUs supported by BBU #1 and that RRU #0, RRU #2, RRU #3, RRU #5 and RRU #7 associated with BBU #0 are RRUs neighboring an RRU associated with BBU #1. Thereafter, BBU #0 may transmit, to BBU #1, measurement information reported by the UE, the measurement results of the RRUs associated with BBU #1, measurement results of RRUs neighboring the associated RRUs, and measured UE identifiers. At this time, an indicator indicating whether each RRU is a serving RRU for a BBU #0 or an RRU neighboring the serving RRU may be additionally transmitted.

For simplicity, it is assumed in this example that neighboring RRUs of BBU #0 are connected to BBU #1. However, the RRUs neighboring BBU #0 or BBU #1 may be connected to other BBUs. While configuring coverage of the UE in an RRU unit has been described above for simplicity, and embodiments of the present invention are not limited. The coverage of the UE may be configured in a carry unit.

In this case, information about neighboring RRU (cell or carrier) of RRUs associated with a BBU may be transmitted through a cell index, cell ID, and PCID which indicate each carrier, and the UE may perform measurement in an RRU (cell or carrier) unit and report a corresponding result value.

Embodiment 2—when Coordination Between Multiple BBUs is Performed

When BBUs exchange information about RRUs associated therewith and/or neighboring RRUs or information about serving RRU and/or neighboring RRUs of respective BBUs of a UE (which may be generated in the step of X2 setup preparation or be periodically updated), the BBUs may be associated with RRUs or RRUs of the associated RRUs, and coordination may be performed only when a UE is supported by multiple BBUs.

Multiple BBUs may perform coordination for measurement of a UE. The coordination procedure may allow the UE to effectively perform measurement reporting. That is, as mentioned above, the UE may be prevented from repeatedly transmitting overlapping information.

For multiple BBUs to perform coordination and instruct measurement for a UE, an RRC configuration message may be configured using various methods, Coordination Method 1

Multiple BBUs may exchange information about RRUs associated therewith and neighboring RRUs of the associated RRUs with each other. For example, referring to FIG. 6, BBU #0 and BBU #1 may exchange information about RRUs associated therewith and neighboring RRUs of the associated RRUs. BBU #0 may configure an initial neighboring RRU (cell or carrier) list using the result of measurement reporting performed by a UE connected to an RRU associated therewith. In this case, the UE may transmit IDs of a BBU, RRU and even cell of a neighboring RRU (cell or carrier). Thereafter, BBU #0 may perform coordination with multiple BBUs (which may be BBUs associated with an RRU neighboring an RRU which is associated with a BBU and acquired through a measurement report of the UE) based on the neighboring RRU (cell or carrier) list. Thereafter, the neighboring cell lists for measurement reporting may be newly transmitted to the UE according to UE specific coverage of the UE.

For example, BBU #0 may transmit, to BBU #1, an RRU information request message containing the message type (an indicator indicating the RRU information request message), BBU #0 (source BBU ID), BBU #1 (destination BBU ID), and {associated RRUs, a neighboring RRU list of the associated RRUs}. Herein, {associated RRUs, a neighboring RRU list of the associated RRUs} may be transmitted in the form of {(RRU #0, RRU #1, RRU #2), (RRU#2, RRU #0, RRU #1, RRU #3, RRU #4), (RRU#3, RRU #1, RRU #2, RRU #4, RRU #5, RRU #6, RRU #7)} as shown in FIG. 6. Upon receiving the message, BBU #1 may acquire information about RRUs associated with BBU #0 and information about RRUs neighboring the RRUs. In addition, BBU #1 may transmit, to BBU #0, an RRU information response message containing the message type (indicator indicating the RRU information response message), BBU #1 (source BBU ID), BBU #0 (destination BBU ID), {associated RRUs, a neighboring RRU list of the associated RRUs}. In this case, {associated RRUs, a neighboring RRU list of the associated RRUs} may be transmitted in the form of {(RRU #1, RRU #0, RRU #2, RRU #3, RRU #5), (RRU#4, RRU #2, RRU #3, RRU #7)} as shown in FIG. 6.

Upon receiving the message, BBU #0 may acquire information about RRUs associated with BBU #1 and information about RRUs neighboring the RRUs. In this case, it is assumed that BBUs supporting the UE or some or a specific BBUs among the BBUs supporting the UE are aware of the coverage (RRU(s) or cell(s)/carrier(s)) configured for the UE. In applying the present invention, the method for acquire information about the coverage (RRU(s) or cell(s)/carrier(s)) of the UE is limited.

Coordination Method 2

In the case where multiple BBUs are supported for a UE, the BBUs may exchange information about RRUs connected to the UE and neighboring RRUs of the connected RRUs in the procedure of configuring the multiple BBUs or a procedure after the configuring procedure.

For example, BBU #0 may transmit, to BBU #1, an RRU information request message containing a message type (an indicator indicating the RRU information request message), BBU #0 (source BBU ID), BBU #1 (destination BBU ID), and {associated RRUs, a neighboring RRU list of the associated RRUs}. In this case, the associated RRUs and a neighboring RRU list of the associated RRU may be transmitted in the form of {(RRU #0, RRU #1, RRU #2), (RRU#2, RRU #0, RRU #1, RRU #3, RRU #4), (RRU#3, RRU #1, RRU #2, RRU #4, RRU #5, RRU #6, RRU #7)}, ID of the UE (C-RNTI, GUTI (Globally Unique Temporary Identifier), S-TMSI (SAE Temporary Mobile Subscriber Identity), M-TMSI (MME Temporary Mobile Subscriber Identity), UE S1AP ID, UE X2AP ID, etc.). Alternatively, {associated RRUs, a neighboring RRU list of the associated RRUs} may not be transmitted. Instead, associated RRUs of the UE and a neighboring RRU list of the associated RRUs may be transmitted separately. That is, {an indicator indicating the associated RRUs, RRU #0, RRU #2, RRU #3}, and {an indicator indicating neighboring RRUs of the associated RRUs, RRU #1, RRU #4, RRU #5, RRU #6, RRU #7} may be transmitted. Upon receiving this information, BBU #1 may acquire information about RRUs associated with BBU #0 and neighboring RRUs of the associated RRUs in the coverage of the UE.

In addition, BBU #1 may transmit, to BBU #0, an RRU information response message containing a message type (indicator indicating the RRU information response message), BBU #1 (source BBU ID), BBU #0 (destination BBU ID), {associated RRUs, a neighboring RRU list of the associated RRUs}, and IDs of the UE (C-RNTI, GUTI (Globally Unique Temporary Identifier), S-TMSI (SAE Temporary Mobile Subscriber Identity), M-TMSI (MME Temporary Mobile Subscriber Identity), UE S1AP ID, UE X2AP ID, etc.). In this case, {associated RRUs, a neighboring RRU list of the associated RRUs} may be transmitted in the form of {(RRU #1, RRU #0, RRU #2, RRU #3, RRU #5), (RRU#4, RRU #2, RRU #3, RRU #7)} as shown in FIG. 6. Alternatively, {associated RRUs, a neighboring RRU list of the associated RRUs} may not be transmitted. Instead, associated RRUs of the UE and neighboring RRU lists of the associated RRUs may be transmitted separately. That is, {an indicator indicating the associated RRUs, RRU #1, RRU #4}, and {an indicator indicating neighboring RRUs of the associated RRUs, RRU #0, RRU #2, RRU #3, RRU #5, RRU #7} may be transmitted.

Upon receiving this information, BBU #0 may acquire information about RRUs associated with BBU #1 and neighboring RRUs of the associated RRUs in the coverage of the UE.

Exchange of the aforementioned information between BBUs may be performed via an X2 interface, S1 interface through an MME, or a new interface defined between the BBUs.

The BBUs supporting a UE may acquire information about a measurement RRU (cell or carrier) of each of the BBUs through the aforementioned coordination procedure. The BBUs may determine measurement configuration information for the UE using various methods. The determined measurement configuration information may be transmitted by the respective BBUs or by a specific BBU.

Measurement Configuration Determining Method 1—Each BBU Establishes a Measurement Configuration The BBUs may acquire information about associated RRUs of the respective BBUs and information about neighboring RRUs of the associated RRUs through the aforementioned procedure, and may transmit a measurement configuration message contain information about RRUs associated therewith for a UE and information about neighboring RRUs.

Using Priorities of Serving RRUs and Neighboring RRUs

In example of FIG. 6, when BBU #0 and BBU #1 performed the aforementioned coordination procedure, it may be predetermined that serving RRUs are prioritized over neighboring RRU. Thereby, each BBU may establish a measurement configuration for serving RRUs associated therewith. If the serving RRUs and neighboring RRUs include RRUs overlapping serving RRUs of other BBUs, measurement configuration may not be established for the overlapping RRUs. In contrast, it may be assumed that neighboring RRUs are prioritized over serving RRUs.

Using Priorities of BBUs Transmitting an RRU Information Request/Response Message When multiple BBUs perform the aforementioned coordination procedure, a BBU transmitting an RRU information request message may be prioritized over a BBU receiving the message. For example, since BBU #0 is transmitted an RRU information request message, it may be predetermined that information overlapping between two BBUs is transmitted by BBU #0. In contrast, BBUs transmitting an RRU information response message may be prioritized.

Determining a BBU to Establish Measurement Configuration Using a Newly Defined Indicator or Message A BBU to transmit overlapping information may be determined using a new indicator or message defined in the aforementioned coordination procedure or an additional procedure. In this case, a BBU to transmit all overlapping information may be determined, and BBUs to transmit respective pieces of overlapping information may be determined.

For example, if a specific BBU transmits a priority indicator field set to '1', and a BBU receiving this information has common overlapping information, the BBU may recognize that the specific BBU will transmit this information, and the specific BBU may transmit the overlapping information. Alternatively, a BBU receiving the priority indicator field may transmit ACK information for the indicator to the specific BBU. Only when the BBU receives the ACK information, the specific BBU may transmit information overlapping the information of other BBUs. The priority indicator field may be transmitted in a BBU unit or an RRU (or cell or carrier) information unit which a BBU transmits to other BBUs.

In example of FIG. 6, BBU #0 may transmit, to BBU #1, an RRU information request message containing a priority indicator field set to '1'. Upon receiving this message, BBU #1 may recognize that BBU #0 transmit information overlapping between BBU #1 and BBU #0, and may transmit, to BBU #0, an RRU information response message with a priority indicator Ack field set to '1' in the message. Upon receiving this information, BBU #0 may recognize that BBU #0 is allowed to transmit overlapping information, and may transmit a measurement configuration-related message containing the overlapping information to a UE. BBU #1 may recognize that BBU #1 need not transmit the overlapping information for the UE, and thus transmit a measurement configuration-related message to the UE, excluding the overlapping information.

Upon receiving the measurement configuration messages from the respective BBUs, the UE may perform measurement according to the configuration messages from the BBUs, and transmit a measurement report to the BBUs. Alternatively, the UE may transmit all measurement results of measurement configurations established by all (or some) BBUs to a specific BBU. In this case, a method for the UE to determine the specific BBU may be configured by the network. Or the specific BBU may be determined by the UE, a measurement record may be transmitted to the determined BBU using the reporting method of Embodiment 2 given for the case where the aforementioned coordination between multiple BBUs is not performed.

An example of FIG. 6, BBU(s) may transmit {RRU#0, RRU #1, RRU #2, RRU #3, RRU #4, RRU #5, RRU #6, RRU #7} through the measurement report group field in a measurement configuration message. When it is assumed that measurement results of the other RRUs or defined to be transmitted to the leading transmitted RRU (or may be defined by a new field), a UE receiving the measurement report group field may transmit measurement reports on RRU #1, RRU #2, RRU #3, RRU #4, RRU #5, RRU #6 and RRU #7 to RRU #0 (BBU #0). Alternatively, the UE may determine BBU #0 and BBU #1 or specific RRUs and transmit the measurement report thereto.

It may be predefined that a BBU receiving the measurement report delivers the measurement result of an overlapping RRU to another BBU having serving RRUs or neighboring RRUs of the serving RRUs, or determine whether to deliver the same.

A. Unconditionally Delivering Overlapping RRU Information

In the aforementioned coordination procedure between BBUs, the BBUs may recognize overlapping RRUs among RRUs associated with the BBUs or RRUs configured for a UE, and a BBU receiving measurement results of the overlapping RRUs transmitted from the UE may unconditionally deliver such information and IDs of the UE to other BBUs having the overlapping RRUs as RRUs associated therewith or neighboring RRUs of the associated RRUs (or serving RRUs for the UE or neighboring RRUs of the serving RRUs).

A. Determining Whether to Deliver Information According to a Delivery Request Field Between BBUs BBUs may announce whether they desire to receive measurement results of overlapping RRUs from a UE in the aforementioned procedure of coordination between BBUs (or a procedure of the determining a BBU to establish measurement configuration) (or after the coordination procedure). When a specific BBU transmits, to other BBUs, information about RRUs associated therewith and neighboring RRUs of the associated RRUs or information about serving RRUs of a UE and neighboring RRUs of the serving RRUs, the specific BBU may transmit {delivery request indicator, RRU ID} and UE identifiers through a measurement report delivery request message (or RRU information request message or RRU information response message) to request that measurement result values for a specific RRU of a UE be received from other BBUs.

Upon receiving the delivery request the field, the BBU may determine whether to deliver a measurement result and transmit Ack/Nack information through a measurement report delivery response message (or RRU information response message or RRU information response Ack message). Information about this delivery request field and Ack/Nack may be configured in a BBU unit or RRU unit (or carrier).

For example, in the example of FIG. 6, when BBU #0 determines to establish measurement configuration of RRU #5 and RRU #7, which overlapping RRUs among neighboring RRUs of serving RRUs of BBU #0 and RRUs neighboring the serving RRUs of BBU #1, for a UE, BBU #1 may transmit, to BBU #0, a measurement report delivery request message containing the identifier of the UE and {RRU ID, a delivery request indicator}. That is, BBU #1 may transmit a message type (an indicator indicating the measurement report delivery request message), ID of the UE, {RRU #5, '1'} and {RRU #7, '1'}. In this example, it is assumed that a delivery request is made when the delivery request indicator is set to '1'. Upon receiving this message, BBU #0 may determine to deliver, to BBU #1, measurement results of RRU #5 and RRU #7 reported to BBU #0 by the UE, recognizing that BBU #1 has requested the #1 receive the measurement results of RRU #5 and RRU #7. Then, BBU #0 may deliver, to BBU #1, a response message for the measurement report delivery request message. Upon receiving this message, BBU #1 may recognize whether BBU #0 will deliver the measurement results of RRU #5 and RRU #7 measured by the UE thereto, based on the value of the delivery response indicator in the measurement report delivery response message.

As another example, the measurement report delivery request message may contain a message type (an indicator indicating the measurement report delivery request message), ID of a UE, and {RRU ID, delivery response indicator}. In this example, the message may contain a message type (indicator indicating the measurement report delivery request message), ID of a UE, {RRU #5, '1'} and {RRU #7, '0'}. Upon receiving this message, BBU #1 may recognize that BBU #0 will deliver measurement result of RRU #5 of the UE but has determine not to deliver a measurement result of RRU #7 of the UE.

In this case, if BBU #0 has received measurement results of RRU #5 and RRU #7 from the UE, BBU #0 may deliver, to BBU #1, the measurement result of RRU #5 received from the UE, but may not deliver the measurement result of RRU #7 to the BBU #1.

Measurement Configuration Determining Method 2—A Specific BBU Establishes Measurement Configuration After exchange of information about associated RRUs and information about RRUs neighboring the associated RRUs between BBUs, a specific BBU may transmit a measurement configuration message containing information about the other BBUs on behalf of the UE. The specific BBU may recognize overlapping information of the other BBUs through the previous procedure, and this information may be configured in a non-overlapping manner. In this case, the UE may transmit measurement reports only to the specific BBU or to multiple BBUs.

When Measurement Reports are Transmitted to the Specific BBU

In the example of FIG. 6, BBU #0 may establish measurement configuration for a UE as shown in Table 5. That is, BBU #0 may transmit, to the UE, both information about RRUs associated with BBU #0 related to the UE and neighboring RRUs of the associated RRUs and information about RRUs associated with BBU #1 and neighboring RRUs of the associated RRUs, using a measurement configuration message. That is, information about serving RRUs (which may be transmitted via a message other than the measurement configuration) and information about neighboring RRUs may be transmitted to the UE using a measurement configuration message in the form of {an indicator indicating the associated RRUs, RRU #0, RRU #1, RRU #2, RRU #3, RRU #4} or {an indicator indicating neighboring RRUs of the associated RRUs, RRU #5, RRU #6, RRU #7}.

Upon receiving the measurement configuration message, the UE may measure a signal of the RRU(s) (or cell(s) or carrier(s)) contained in the configuration message, and transmit all the corresponding measurement results to BBU #0 which has transmitted the measurement configuration message. In this case, a message used in LTE Rel-9/10/11 may be reused. While it is illustrated in this example that measurement reports are transmitted to a BBU having established measurement configuration for the UE, for simplicity of description. In the case where a measurement report is transmitted to different BBUs, the UE may additionally signal RRU ID or BBU ID to which the measurement report needs to be transmitted.

When Measurement Report is Transmitted to Respective BBUs

If it is determined in the previous procedure that BBU #0 receives measurement reports on RRU #0, RRU #2, RRU #3, RRU #5 and RRU #6 for the UE and BBU #1 receives measurement reports on RRU #1 and RRU #4, BBU #0 may group RRUs into {RRU#0, RRU #2, RRU #3, RRU #5, RRU #6, RRU #7} and {RRU #1, RRU #4} to establish measurement configuration. Upon receiving the configuration, the UE may measure signals of RRUs in the first group, determine specific RRU(s) via which measurement results will be transmitted among the RRUs of the first group, and send a measurement report to BBU #0 via the specific RRU(s). In addition, the UE may measure signals of RRUs in the second group, determine specific RRU(s) via which measurement results will be transmitted among the RRUs of the second group, and send a measurement report to BBU #1 via the specific RRU(s).

Alternatively, BBU #0 may announce an RRU via which a measurement report on a configured group will be sent. For example, it may be predefined that a UE should transmit a measurement report via an RRU which comes first in a group configured by a BBU, or a corresponding indicator (or field) may be newly defined and used to announce RRU(s) via which a measurement report should be sent. In the aforementioned example, suppose that it is predefined that a UE should transmit a measurement report via an RRU which comes first in a group configured by a BBU. In this case, when BBU #0 transmits a measurement configuration message in the form of {RRU#0, RRU #2, RRU #3, RRU #5, RRU #6, RRU #7} and {RRU #1, RRU #4} for a UE, the UE may recognize that measurement result values of RRU(s) configured in each group should be reported to RRU #0 and RRU #1 and perform measurement reporting.

All methods mentioned under Method 2 may also be used as in the case where BBUs receiving measurement reports mentioned in the measurement configuration determining method 1 (when respective BBUs establish measurement configuration) from a UE may deliver measurement results of overlapping RRUs to other BBUs having the overlapping RRUs as serving RRUs or neighboring RRUs of the serving RRUs.

While RRU ID is adopted in the embodiments as an RRU unit for simplicity, a carrier unit to be adopted and divided into cell index, PCID and cell ID.

Hereinafter, configuration of an apparatus for implementation of the embodiments described above will be described.

Figure 8:
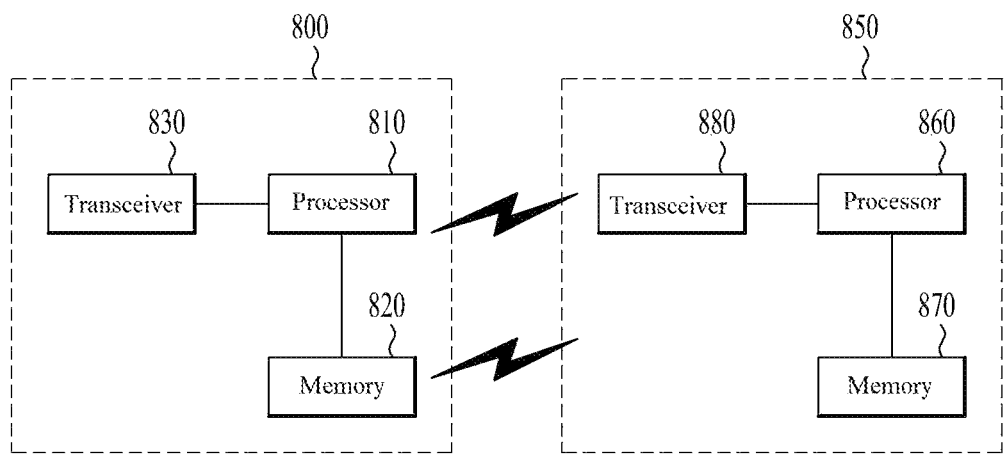
FIG. 8 is a block diagram illustrating a radio apparatus according to an embodiment of the present invention.

FIG. 8 is a block diagram illustrating a radio apparatus according to an embodiment of the present invention.

In FIG. 8, a radio apparatus 800 may be a UE, and a radio apparatus 850 may be an apparatus of a network terminal. Specifically, the radio apparatus 850 may include a BBU and an RRU. The radio apparatus of 850 may be a macro eNB, a small cell eNB, or the like.

The UE 800 may include a processor 810, a memory 820 and a transceiver 830. The network apparatus 850 may include a processor 860, a memory 870 and a transceiver 880. The transceivers 830 and 880 may transmit/receive radio signals and be implemented in a physical layer of, for example, 3GPP/IEEE 802. The processors 810 and 860 may be implemented in the physical layer and/or MAC layer and connected to the transceivers 830 and 880. The processors 810 and 860 may execute the procedure of transmission and reception of the aforementioned system information.

The processors 810 and 860 and/or the transceivers 830 and 880 may include an application-specific integrated circuit (ASIC), another chip set, a logic circuit and/or a data processor. The memories 820 and 870 may include a ROM (read-only memory), RAM (random access memory), flash memory, a memory card, a storage medium and/or other storage units. When an embodiment is implemented by software, a method described above may be executed as a module (e.g., a processor, function) for performing the functions described above. The module may be stored in the memories 820 and 870, and executed by the processors 810 and 860. The memories 820 and 870 may be disposed inside or outside the processors 810 and 860, and be connected to the processors 810 and 860 by a well-known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention disclosed in the appended claims. Thus, the present invention is not intended to be limited to the embodiments described herein, but is intended to accord with the widest scope corresponding to the principles and novel features disclosed herein.

INDUSTRIAL APPLICABILITY

Although embodiments of the present invention have been described above focusing on the 3GPP-based 5G mobile communication system, they are applicable to various mobile communication systems. The embodiments may be used for a system which needs measurement for mobility of a UE in a wireless network environment where heterogeneous networks coexist.

The invention claimed is:

1. A method for performing measurement by a user equipment (UE) in a cloud wireless communication system comprising one or more baseband units (BBUs) and one or more remote radio units (RRUs) connected to a specific BBU of the BBUs to directly provide a service to the UE via one or more cells, the method comprising:
respectively receiving a first measurement configuration message from a first BBU and a second measurement configuration message from a second BBU, the first BBU and the second BBU being connected to the UE;
respectively adding a result of measurement on one or more first RRUs to be measured according to the first measurement configuration message to a first measurement report message and a result of measurement on one or more second RRUs to be measured according to the second measurement configuration message to a second measurement report message; and
respectively transmitting the first measurement report message to the first BBU and the second measurement report message to the second BBU,
wherein, when the first RRUs and the second RRUs comprise one or more overlapping RRUs, a result of measurement on the one or more overlapping RRUs is added to only one of the first measurement report message and the second measurement report message.

2. The method according to claim 1, wherein the one or more first RRUs comprise one or more first serving RRUs and one or more first neighboring RRUs, and
wherein the one or more second RRUs comprise one or more second serving RRUs and one or more second neighboring RRUs.

3. The method according to claim 2, wherein, when the one or more overlapping RRUs are included in the first serving RRUs and the second neighboring RRUs, the result of measurement on the one or more overlapping RRUs is added to the first measurement report message.

4. The method according to claim 2, wherein, when the one or more overlapping RRUs are included in the second serving RRUs and the first neighboring RRUs, the result of measurement on the one or more overlapping RRUs is added to the second measurement report message.

5. The method according to claim 1, wherein at least one of the first measurement report message and the second measurement report message further contains an indicator indicating whether to deliver the result of measurement on the one or more overlapping RRUs.

6. A user equipment (UE) for performing measurement in a cloud wireless communication system comprising one or more baseband units (BBUs) and one or more remote radio units (RRUs) connected to a specific BBU of the BBUs to directly provide a service to the UE via one or more cells, the UE comprising:
a transceiver; and
a processor connected to the transceiver,
wherein the processor is configured to:
control the transceiver to respectively receive a first measurement configuration message from a first BBU and a second measurement configuration message from a second BBU,
wherein the first BBU and the second BBU are connected to the UE,
respectively add a result of measurement on one or more first RRUs to be measured according to the first measurement configuration message to a first measurement report message and a result of measurement on one or more second RRUs to be measured according to the second measurement configuration message to a second measurement report message, control the transceiver to respectively transmit the first measurement report message to the first BBU and the second measurement report message to the second BBU, and when the first RRUs and the second RRUs comprise one or more overlapping RRUs, add a result of measurement on the one or more overlapping RRUs to only one of the first measurement report message and the second measurement report message.

* * * * *